United States Patent
Ashida et al.

(10) Patent No.: US 10,331,348 B2
(45) Date of Patent: Jun. 25, 2019

(54) READING AND WRITING VIA FILE SYSTEM FOR TAPE RECORDING SYSTEM

(71) Applicant: International Business Machines Corporation, Armonk, NY (US)

(72) Inventors: Takashi Ashida, Yamato (JP); Tohru Hasegawa, Tokyo (JP); Hiroshi Itagaki, Kanagawa (JP); Shinsuke Mitsuma, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 14/708,326

(22) Filed: May 11, 2015

(65) Prior Publication Data

US 2015/0347022 A1    Dec. 3, 2015

(30) Foreign Application Priority Data

May 28, 2014  (JP) ................. 2014-110671

(51) Int. Cl.
| | | |
|---|---|---|
| *G06F 12/08* | (2016.01) | |
| *G06F 3/06* | (2006.01) | |
| *G06F 12/0866* | (2016.01) | |

(52) U.S. Cl.
CPC .......... *G06F 3/0607* (2013.01); *G06F 3/0613* (2013.01); *G06F 3/0643* (2013.01);
(Continued)

(58) Field of Classification Search
CPC ............................ G06F 3/0607; G06F 12/0866
See application file for complete search history.

(56) References Cited

U.S. PATENT DOCUMENTS

| | | | | |
|---|---|---|---|---|
| 5,636,355 A | * | 6/1997 | Ramakrishnan | G06F 12/0804 |
| | | | | 711/113 |
| 5,734,859 A | * | 3/1998 | Yorimitsu | G06F 11/1076 |
| | | | | 711/112 |

(Continued)

FOREIGN PATENT DOCUMENTS

| | | |
|---|---|---|
| JP | 54103640 A | 8/1979 |
| JP | 2002182952 A | 6/2002 |
| JP | 2003150413 A | 5/2003 |

OTHER PUBLICATIONS

IBM, Linear Tape File System (LTFS) Format Specification, Apr. 12, 2010.*

(Continued)

*Primary Examiner* — Ryan Bertram
*Assistant Examiner* — Trang K Ta
(74) *Attorney, Agent, or Firm* — Alexander G. Jochym

(57) ABSTRACT

Communicating data with a medium is provided. A cache is provided for storing target data of a file identified by an access request from an application of a host. The cache is divided into a read cache, a write cache, and an index cache. Responsive to receiving the access request: the medium is loaded onto a drive using a file system; target data is stored to the write cache and to the read cache; and the index file stored in the index cache is updated to reflect position metadata about the target data stored in the write cache. Responsive to initiating unloading of the medium from the drive: the updated index file stored in the index cache is written to the index partition of the medium; and the target data stored in the write cache is written onto a data partition of the medium without using the file system.

19 Claims, 12 Drawing Sheets

(52) U.S. Cl.
CPC .......... *G06F 3/0682* (2013.01); *G06F 3/0686* (2013.01); *G06F 12/0866* (2013.01); *G06F 2212/213* (2013.01)

(56) References Cited

U.S. PATENT DOCUMENTS

| | | | | |
|---|---|---|---|---|
| 8,954,663 | B1* | 2/2015 | Klein | G06F 3/0619 711/111 |
| 9,390,116 | B1* | 7/2016 | Li | G06F 17/30336 |
| 2003/0200396 | A1* | 10/2003 | Musumeci | G06F 9/3804 711/137 |
| 2008/0168220 | A1* | 7/2008 | Gill | G06F 12/0804 711/113 |
| 2011/0219184 | A1* | 9/2011 | Jaquette | G11B 27/002 711/111 |
| 2011/0238716 | A1* | 9/2011 | Amir | G06F 3/0611 707/823 |
| 2013/0132663 | A1* | 5/2013 | Eleftheriou | G06F 12/0866 711/111 |

OTHER PUBLICATIONS

"Method for Reading and Writing via File System for Tape Recording System", Japanese application No. 2014-110671, filed May 28, 2014, pp. 1-49.

* cited by examiner

FIG. 4A

LTFS FORMAT AND FILE ADDITION/UPDATE

INFORMATION THAT IS WRITTEN ONTO TAPE IMMEDIATELY AFTER INITIALIZATION IN LTFS FORMAT

IP: | FID | VOL1 Label | FM | LTFS Label | FM | Index #0 | FM |

DP: | FID | VOL1 Label | FM | LTFS Label | FM | Index #0 | FM |

FIG. 4B

INFORMATION THAT IS WRITTEN ONTO TAPE IN THE CASE WHERE FILE 1 IS WRITTEN AFTER STATE OF (A)

IP: | FID | VOL1 Label | FM | LTFS Label | FM | Index #0 | FM | Index #1 | FM |

DP: | FID | VOL1 Label | FM | LTFS Label | FM | Index #0 | FM | File 1 | FM | Index #1 | FM |

FIG. 4C

INFORMATION THAT IS WRITTEN ONTO TAPE IN THE CASE WHERE PLURALITY OF FILES (FILE 2) ARE WRITTEN AFTER STATE OF (B)

IP: FID | VOL1 Label | FM | LTFS Label | FM | Index #2 | FM

DP: FID | VOL1 Label | FM | LTFS Label | FM | Index #0 | FM | File 1 | FM | File 2 | FM | Index #2 | FM

FIG. 4D

INFORMATION THAT IS WRITTEN ONTO TAPE AFTER FILE 1 IS UPDATED BY ADDING CHARACTER INFORMATION (FILE 1-2) TO TAIL END OF FILE 1 AFTER STATE OF (B)

IP: FID | VOL1 Label | FM | LTFS Label | FM | Index #2 | FM

DP: FID | VOL1 Label | FM | LTFS Label | FM | Index #0 | FM | File 1-1 | FM | Index #1 | FM | File 1-2 | FM | Index #2 | FM REWRITING OF FILE 1 (SIZE L) AND EXTENTS
(POSITION META-INFORMATION INCLUDED IN INDEX FILE)

REWRITING OF FILE 1 (SIZE L) AND EXTENT

EXAMPLE OF CACHE TABLE

WRITE ORDER DATA TABLE (UPPER TABLE)

| DATA NAME ON CACHE | PATH NAME ON TAPE | offset | length |
|---|---|---|---|
| 001.dat | dirA/fileA.txt | 0 | 1024000 |
| 002.dat | dirA/fileB.txt | 0 | 512000 |
| 003.dat | dirA/fileA.txt | 1024000 | 512000 |

CONNECTED DATA TABLE (LOWER TABLE)  REARRANGE TABLE IN TERMS OF PIECES OF DATA INCLUDED IN SAME FILE

| DATA NAME ON CACHE | PATH NAME ON TAPE | offset | length |
|---|---|---|---|
| 001.dat 003.dat | dirA/fileA.txt | 0 | 1536000 |
| 002.dat | dirA/fileB.txt | 0 | 512000 |

READING AND WRITING VIA FILE SYSTEM FOR TAPE RECORDING SYSTEM

TECHNICAL FIELD

The present invention relates to reading and writing via a file system for a tape recording system. More specifically, the present invention relates to unloading a tape cartridge (a tape, a medium) in a short time by reading and writing data in a file at high speed using a cache.

BACKGROUND OF THE INVENTION

A linear tape file system (LTFS) as a file system for a tape drive enables data to be written and read to and from a medium from an application on an OS (Linux, Windows, Mac OS X) in units of a file. The LTFS can be used as the file system for the tape drive together with a fifth-generation linear tape open (LTO) tape drive (LTO5) and a fourth-generation IBM enterprise tape drive TS 1140. The LTFS enables a user (application) to use a tape cartridge as a high-capacity external recording medium through an operation of loading and unloading the tape cartridge as a removable medium with respect to a drive. In read and write access to the medium by the tape drive, time required for operations of unloading and loading the medium and queuing data on the medium are in units of seconds, and this deteriorates access performance.

A method generally known to reduce waiting time due to a low-speed storage includes, for example, using a high-speed storage (for example, a HDD, a flash storage) as a cache. In the case where a tape cartridge (LTFS tape) is read and written using the LTFS, this method is considered to be useful. In the case where the LTFS is used for a removable medium such as the tape cartridge, when the target medium is unloaded from a drive, the entire data on the cache is written out onto the removable medium. On this occasion, the entire data on the cache is written back onto the LTFS tape at a time. Because this write-back operation is started after the medium unload is requested, it is desirable that this write-back operation be as short as possible. In conventional use of caches, speeding-up of the write-back operation of the LTFS as the file system for the tape drive is not considered.

SUMMARY

According to one embodiment of the present invention, a method for communicating data with a medium loaded on a tape apparatus via a file system in a tape recording system connected to a host, the tape recording system including the tape apparatus, is provided. The method includes: providing a cache for storing target data of a file, the file being identified by an access request received from an application of the host, the cache being divided into: a read cache for storing target data from the medium in response to a read access; a write cache for storing target data from the application in response to a write access; and an index cache for storing an index file acquired from an index partition of the medium, the index file including metadata about a plurality of files; in response to receiving the access request: loading the medium onto a drive using a file system; storing target data to the write cache and to the read cache; and updating the index file stored in the index cache to reflect position metadata about the target data stored in the write cache; in response to initiating unloading of the medium from the drive: writing the updated index file stored in the index cache to the index partition of the medium; and writing the target data stored in the write cache onto a data partition of the medium without using the file system.

According to another embodiment of the present invention, a program product for program product for communicating data with a medium loaded on a tape apparatus via a file system in a tape recording system connected to a host, the tape recording system including the tape apparatus, is provided. The computer program product comprises a computer readable storage medium and program instructions stored on the computer readable storage medium. The program product causes the tape recording system to: provide a cache for storing target data of a file, the file being identified by an access request received from an application of the host, the cache being divided into: a read cache for storing target data from the medium in response to a read access; a write cache for storing target data from the application in response to a write access; and an index cache for storing an index file acquired from an index partition of the medium, the index file including metadata about a plurality of files; in response to receiving the access request: load the medium onto a drive using a file system; store target data to the write cache and to the read cache; and update the index file stored in the index cache to reflect position metadata about the target data stored in the write cache; in response to initiating unloading of the medium from the drive: write the updated index file stored in the index cache to the index partition of the medium; and write the target data stored in the write cache onto a data partition of the medium without using the file system.

According to another embodiment of the present invention, tape recording system for communicating data with a medium loaded on a tape apparatus via a file system, the tape recording system comprising the tape apparatus, the tape recording system being connected to a host, is provided. The tape recording system is configured to: provide a cache for storing target data of a file, the file being identified by an access request received from an application of the host, the cache being divided into: a read cache for storing target data from the medium in response to a read access; a write cache for storing target data from the application in response to a write access; and an index cache for storing an index file acquired from an index partition of the medium, the index file including metadata about a plurality of files; in response to receiving the access request: load the medium onto a drive using a file system; store target data to the write cache and to the read cache; and update the index file stored in the index cache to reflect position metadata about the target data stored in the write cache; in response to initiating unloading of the medium from the drive: write the updated index file stored in the index cache to the index partition of the medium; and write the target data stored in the write cache onto a data partition of the medium without using the file system.

BRIEF DESCRIPTION OF THE DRAWINGS

FIGS. 4A-4D illustrate contents of an index partition and a data partition of a medium in a LTFS format, in accordance with embodiments of the present invention;

DETAILED DESCRIPTION

Figure 1:
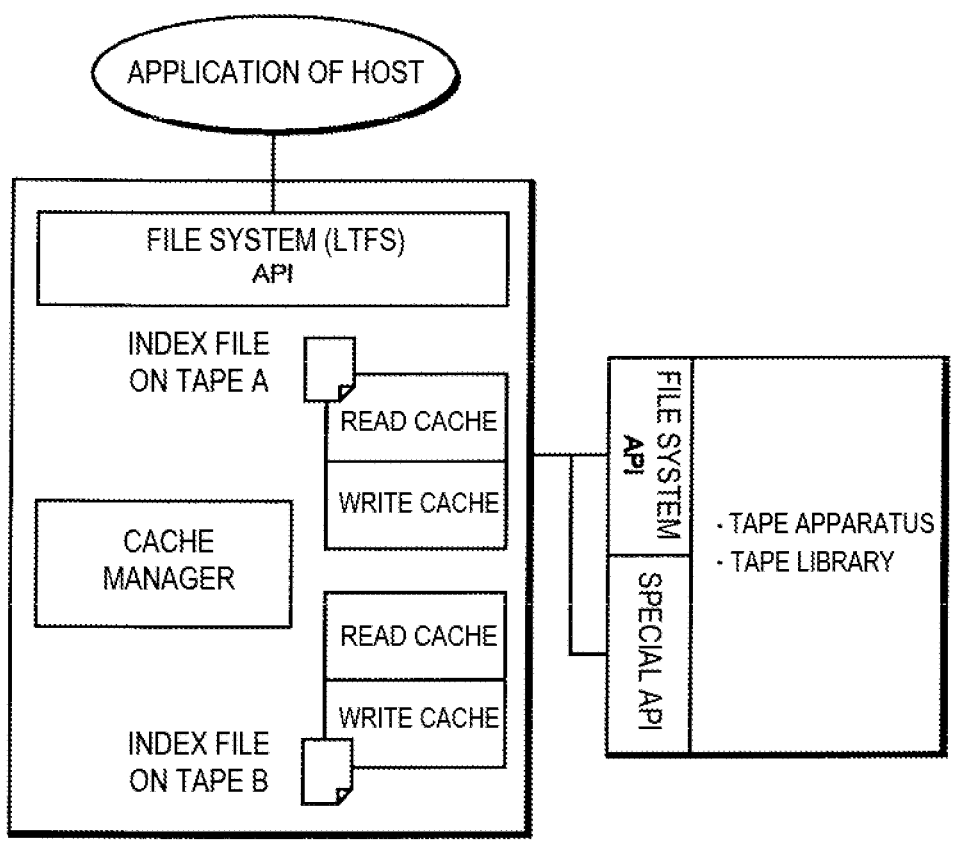
FIG. 1 illustrates a system configuration, in accordance with embodiments of the present invention.

Embodiments of the present invention provide a cache for enhancing an operation of the LTFS prepared on a disk. Embodiments further provide that not only data but also an index file is temporarily stored in the cache and that the subsequent read and write operation is performed on the cache.

Accordingly, embodiments of the present invention provide for performing a write-out operation from a cache in a short time in response to a request to unload a medium.

Embodiments of the present invention provide a method for reading and writing a file with respect to a medium (tape) loaded on a tape apparatus via a file system in a tape recording system connected to a host, the tape recording system including the tape apparatus. The method includes: (a) providing a cache for storing target data included in a file of read and write access (e.g., LTFS-API) received from an application of the host, the cache being divided into: a read cache for storing target data from the medium in response to read access; a write cache for storing target data from the application in response to write access; and an index cache for storing an index file acquired from an index partition of the medium; (b) loading the medium onto a drive in response to the read and write access and reading the index file stored in the index partition (IP) of the medium onto the index cache, the index file including metadata about a plurality of files (first special API); (c) in response to the read and write access (e.g., LTFS-API), storing target data into the write cache and the read cache, updating the index file such that position metadata (extent) of the target data stored in the write cache is reflected, and storing the latest index file into the index cache; and (d) at the time of unloading the medium from the drive (e.g., LTFS-API), writing the updated index file stored in the index cache onto the index partition (IP) of the medium (second special API) and writing the target data (e.g., a part or the entirety of the file) stored in the write cache onto a data partition (DP) of the medium without using the file system (third special API).

Further, in the method for reading and writing the file via the file system, the operation (c) of receiving the target data of the read access (LTFS-API) is characterized in that it includes: checking whether the target data exists in the write cache and the read cache; sending out the target data to the application if the target data exists in the write cache; sending out the target data to the application if the target data exists in the read cache; and sending out the target data to the application from the medium using the file system if the target data does not exist in the write cache or the read cache.

Further, the operation (c) of receiving the target data of the read access is characterized by: discarding least recently used data from the cache if the read cache becomes full; and reading the target data onto a free space thus obtained in the cache from the medium.

Further, in the method for reading and writing the file, the operation (c) of receiving the target data of the write access is characterized in that it includes: checking whether or not the target data of the write access is included in a particular file of a plurality of files including a plurality of pieces of data that have already been stored in the write cache, and rearranging the target data and the plurality of pieces of already written data for each file; and updating the index file on the index cache such that metadata about the target data and the plurality of pieces of data rearranged for each file is reflected in the index file stored in the index cache.

Further, in the method for reading and writing the file, the operation of updating the index file on the index cache is characterized in that it includes: checking whether or not the target data is continuous with pieces of existing data stored in the write cache; and connecting, if the target data is continuous with at least one of the pieces of existing data stored in the write cache, the pieces of continuous data and updating the index file so as to avoid fragmentation.

Further, in the method for reading and writing the file, the operation (c) of updating the index file on the index cache is characterized in that it includes: checking whether or not the target data of the write access is included in a particular file of a plurality of files including a plurality of pieces of data that have already been stored in the write cache; checking, if the target data is included in the same file, whether or not the target data is continuous with the pieces of existing data stored in the write cache; and connecting, if the target data is continuous with at least one of the pieces of existing data stored in the write cache, the pieces of continuous data and updating the index file so as to avoid fragmentation.

Further, the method for reading and writing the file is characterized in that it includes: writing out the pieces of data stored in the write cache onto the medium in order in which the pieces of data are recorded in the index file on the index cache (third special API); and writing, after all the pieces of data are written out, the index file on the index cache onto the data partition (DP) and the index partition (IP) of the medium (second special API).

Further, in the method for reading and writing the file, the cache is characterized in that it is provided to a storage device of the host.

Moreover, embodiments of the present invention provide a program for reading and writing a file with respect to a medium (tape) loaded on a tape apparatus via a file system in a tape recording system connected to a host, the tape recording system including the tape apparatus. The program causes the tape recording system to: (a) provide a cache for storing target data included in a file of read and write access (LTFS-API) received from an application of the host, the cache being divided into: a read cache for storing target data from the medium in response to read access; a write cache for storing target data from the application in response to write access; and an index cache for storing an index file acquired from an index partition (IP) of the medium; (b) load the medium onto a drive in response to the read and write access and read the index file stored in the index partition of the medium onto the index cache, the index file including metadata about a plurality of files; (c) in response to the read and write access (LTFS-API), store target data into the write cache and the read cache, update the index file such that position metadata (extent) of the target data stored in the write cache is reflected, and store the latest index file into the index cache; and (d) at the time of unloading the medium from the drive (LTFS-API), write the updated index file stored in the index cache onto the index partition (IP) of the medium (second special API) and write the target data (a part or the entirety of the file) stored in the write cache onto a data partition (DP) of the medium without using the file system (third special API).

Moreover, in order to achieve the above-mentioned object, embodiments of the present invention provide a tape recording system for reading and writing a file with respect to a medium (tape) loaded on a tape apparatus via a file system, the tape recording system including the tape apparatus. The tape recording system is connected to a host, and is configured to: (a) provide a cache for storing target data included in a file of read and write access (LTFS-API) received from an application of the host, the cache being divided into: a read cache for storing target data from the medium in response to read access; a write cache for storing target data from the application in response to write access; and an index cache for storing an index file acquired from an index partition (IP) of the medium; (b) load the medium onto a drive in response to the read and write access and read the index file stored in the index partition of the medium onto the index cache, the index file including metadata about a plurality of files; (c) in response to the read and write access (LTFS-API), store target data into the write cache and the read cache, update the index file such that position metadata (extent) of the target data stored in the write cache is reflected, and store the latest index file into the index cache; and (d) at the time of unloading the medium from the drive (LTFS-API), write the updated index file stored in the index cache onto the index partition (IP) of the medium (second special API) and write the target data (a part or the entirety of the file) stored in the write cache onto a data partition (DP) of the medium without using the file system (third special API).

If embodiments of the present invention described above are applied, data on every cache can be read and written at high speed at the time of unloading a tape cartridge, and hence speeding-up of the cartridge unload can be achieved. Further, even if a file is repetitively changed by writing via a file system for a tape drive, data fragmentation can be suppressed.

Description is given of an embodiment mode (embodiment) in which, in the case of reading and writing from an application of a host via a file system, a cache is provided, data is written and read onto a tape recording system (tape storage system), and a medium is unloaded.

FIG. 1 illustrates a configuration of a tape recording system, in accordance with embodiments of the present invention.

The tape recording system is a tape apparatus and a tape library connected to an application of a host. In one embodiment, an example case is described in which cartridges Tape A and Tape B are used. Target data is stored in each of a read cache and a write cache, and different index files thereof are put on an index cache.

When the cache for the file system for the tape storage is prepared, not only the data but also the index file is cached, and the subsequent operations are performed on the cache. At the time of LTFS tape unload, when the data is written back from the cache, for example, from a disk onto the LTFS tape, the data is directly written onto the LTFS tape without using an API of the LTFS (LTFS-API). This enables the data to be written out at a native speed of a tape drive while eliminating overhead of the file system.

An application is assumed as an example to which embodiments of the present invention can be applied, in which the application uses software that provides access by a LTFS such as IBM LTFS library edition (LE).

The application provides a file system to a user, controls caches on a disk, and exclusively uses a tape drive used by the LTFS software. Two types of caches (a read cache and a write cache) and an index cache for storing an index file are prepared as the caches on the disk. In the case of handling a plurality of tape cartridges at the same time, these caches are prepared for each tape cartridge in use. In embodiments of the present invention, a cache manager provides the following three special APIs in addition to the read and write access that is made from the application of the host via the LTFS (access using the LTFS-API): a first special API is an API for reading out an index file on a tape; a second special API is an API for writing an externally prepared index file; and a third special API is an API for writing provided data continuously from the tail end of a data partition.

These special APIs are given as examples, and portions of the caches and the cache manager may be provided in the file system (LTFS software). Further, the cache manager and the like may be incorporated not only in the host but also in the tape drive.

A basic operation of an embodiment of the present invention is described.

As in conventional cases, the cache manager of embodiments of the present invention provides an interface of a file system (LTFS-API) to the application (user). When the application makes a request to access a file on the LTFS, the cache manager reads an index file from a tape, and caches the index file. Until the LTFS tape is unloaded from a drive, files on the target tape are accessed using not the index file on the tape but the index file on the cache.

In the case where write access to a file occurs, it is checked whether the target data exists in the write cache and, if not, the read cache. In the case where the target data exists in a particular cache, data contents of the cache are provided. In the case where the target data does not exist, the target data is read out from the tape. The read-out portion is stored into the read cache.

In the case where the write access to a file occurs, a changed portion in the target file is stored into the write cache, and the index file stored in the index cache is updated. At this time, the index file stored in the cache shows a state after the data on the cache is written out onto the tape.

In the case where the read cache becomes full, the least recently used (LRU) data from cached data is discarded. In the case where the write cache becomes full, least recently used (LRU) data is written out onto the tape using the file system API of the LTFS. After write-out completion, the index file on the cache is updated. At this time, the index file is read again from the tape after the write-out completion, and the index file is then updated considering that pieces of data remaining on the cache are sequentially written.

Some embodiments of the present invention are described by way of a specific example. If data A, data B, and data C in the write cache are listed on the index in the stated order, in the case where the data B is written out as LRU data, it is necessary to rearrange the data order on the index file from the data A, the data B, and the data C to the data B, the data A, and the data C. Here, the index file including data up to the data B can be read from the tape, and hence the index file on the cache is updated such that the data A and the data C are appended subsequent to the data B. A cache may be referred to as becoming "full" for convenience, but an appropriate margin is secured at the time of actual implementation, and the above-mentioned operation is performed.

Figure 2:
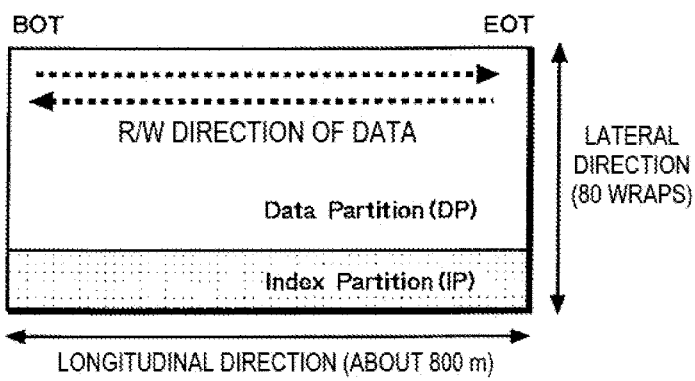
FIG. 2 illustrates a tape divided into two partitions of a LTFS, in accordance with embodiments of the present invention.

FIG. 2 illustrates a tape divided into two partitions of the LTFS.

A LTO5 tape drive writes data while moving back and forth on wraps of a write region along the longitudinal direction of the tape. In the LTFS, two (corresponding to one round trip) of the wraps are used as an index partition. The tape is divided into the two partitions (IP and DP) from the beginning of the tape (BOT) to the end of the tape (EOT). Each wrap is a group of tracks that is read and written by a head at the same time, and sixteen tracks correspond to one wrap. In a tape cartridge of the LTO5, the tape has a length of about 800 m in its longitudinal direction, and has a width corresponding to eighty wraps in its lateral direction. The IP and the DP are separated from each other by a protection region (guard band) configured by two wraps. The tape moves back and forth in the wrap longitudinal direction, and the motion that the travelling direction is reversed at each of the BOT and the EOT is called wrap turn. The typical time required for the tape to move from the BOT to the EOT in the longitudinal direction with respect to the head of the tape drive is 60 to 90 seconds. The typical time required for the tape to move up to the half in the longitudinal direction is about 30 to 45 seconds. The storage capacity of the tape cartridge of the LTO5 is about 1 TB. For example, the capacity of the IP including medium information can be changed by the user, and the IP typically occupies 5% (50 GB) of the entire capacity.

In the file system for the tape drive, for example, the LTFS, data written on a medium can be shown as a file. If the user writes data onto a tape medium using the LTFS, metadata called an index file (sometimes also referred to as an "index") is written onto the tape medium, in addition to the file main body. The index includes, as the metadata, a file name, a file creation date, and position metadata (an extent described in FIG. 5) including a position on the medium, a size, and an offset in the file. The latest index is mainly written onto the IP. The file main body and the index history are written onto the DP.

In the case where a file on a tape medium is read and written using the LTFS, data is read and written in units called records. A record is called a block in the LTFS, and a LTFS format is given thereto. Each block is managed for each partition in which the data of the file is recorded, on the basis of a block number indicating how many other blocks precede this block from the beginning of the partition. The index of each file is configured by the position metadata indicated by the block numbers corresponding to the data of the file.

Figure 3:
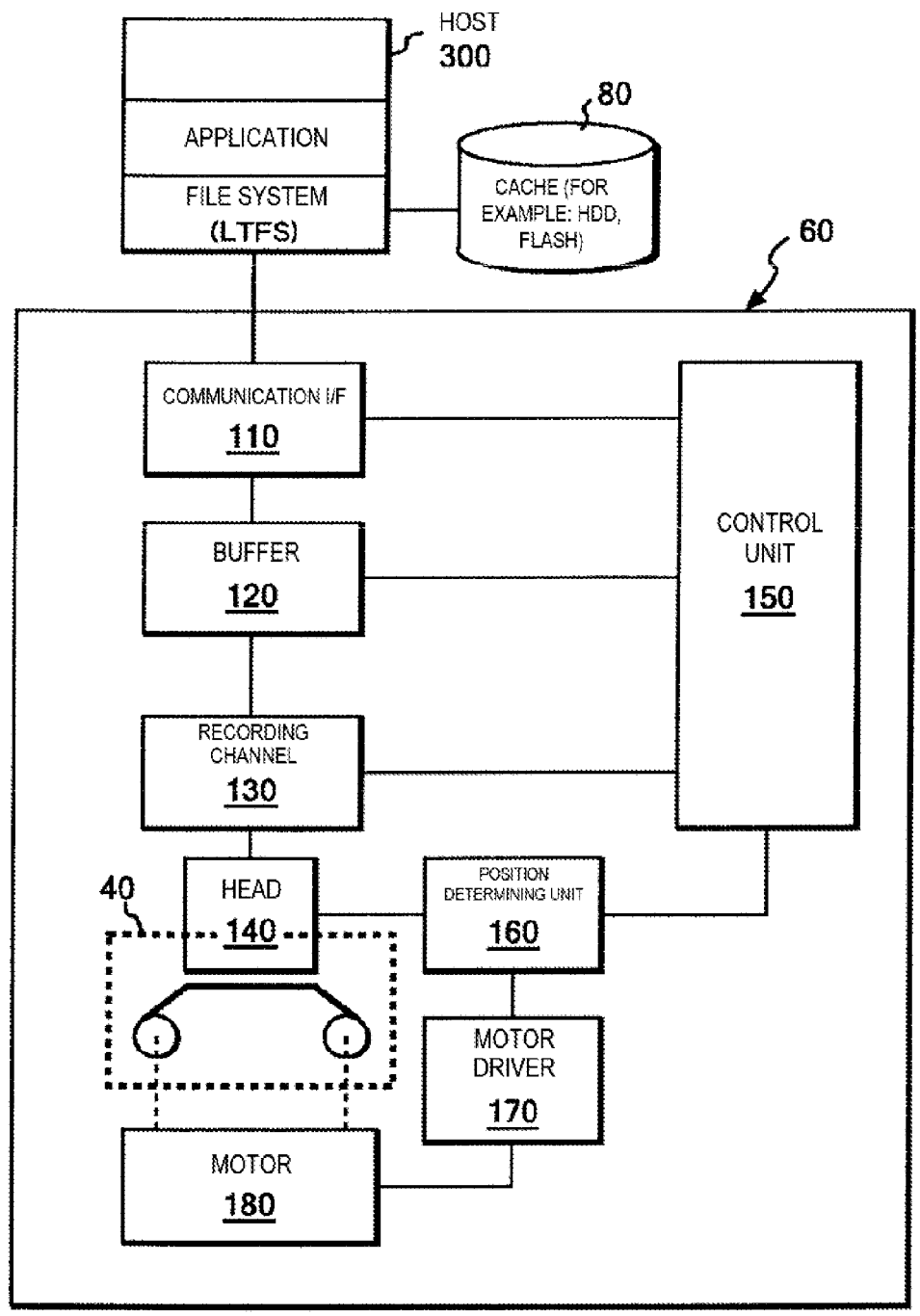
FIG. 3 illustrates a hardware configuration example of a host and a tape storage system (tape recording system) including a tape drive (magnetic tape apparatus), to which embodiments of the present invention are applied.

FIG. 3 illustrates a hardware configuration example of a host and a tape storage system (tape recording system) including a tape drive (magnetic tape apparatus), to which embodiments of the present invention are applied.

A tape drive 60 receives a request to read and write a file from an application of a host 300 via a file system (LTFS). The tape drive includes a communication interface (I/F) 110, a buffer 120, a recording channel 130, a reading and writing head 140, a control unit 150, a position determining unit 160, a motor driver 170, and a motor 180.

The interface 110 communicates with the host 300 via a network. For example, the interface 110 receives a write command for giving an instruction to write data onto a tape cartridge (a tape, a medium) 40, from the host 300. Further, the interface 110 receives a read command for giving an instruction to read out data from the medium 40, from the host 300. The interface 110 has a function of compressing the written data and decompressing the read data, and increases the storage capacity to the medium close to about twice the actual data size.

The tape drive 60 reads and writes data with respect to the medium 40 in units of a data set (referred to as DS) constructed by a plurality of records sent from the application of the host 300. A typical size of the DS is 4 MB. The application of the host 300 designates a file using a file system (for example, the LTFS-API), and issues read and write access to the tape drive 60. The file system sends a request to write and read out records in a SCSI command level to the tape drive. The DS is constructed by the plurality of records.

Each DS includes management information concerning the data set. User data is managed in units of a record. The management information is included in a data set information table (DSIT). The DSIT includes the number of records or blocks and the number of file marks (FMs) included in the DS, as well as the number of cumulative records and the number of cumulative FMs written from the beginning of the medium.

The buffer 120 is a memory in which data to be written onto the medium 40 and data read out from the medium are temporarily accumulated. For example, the buffer 120 is configured by a dynamic random access memory (DRAM). The recording channel 130 is a communication path used to write out data accumulated in the buffer 120 onto the medium 40 or temporarily accumulate data read out from the medium 40 into the buffer 120.

The reading and writing head 140 includes a data reading and writing element, and writes data onto the medium 40 and reads out data from the medium. The reading and writing head 140 according to the present embodiment further includes a servo reading element, and reads a signal from a servo track provided to the medium 40. The position determining unit 160 instructs the reading and writing head 140 to move in the lateral direction (width direction) of the cartridge 40. The motor driver 170 drives the motor 180.

The tape drive 60 writes data onto the tape and reads out data from the tape in accordance with a command received from the host 300. The tape drive 60 includes the buffer, a reading and writing channel, the head, the motor, reels on which the tape is wound, a read and write controller, a head position controlling system, and the motor driver. The tape cartridge is unloadably loaded on the tape drive. The tape moves in the longitudinal direction along with reel rotations. The head moves in the tape longitudinal direction to write data onto the tape and read out data from the tape. Further, the tape cartridge 40 includes a non-contact non-volatile memory called cartridge memory (CM). The CM loaded on the tape cartridge 40 is read and written by the tape drive 60 in a non-contact manner. The CM stores a cartridge attribute therein. At the time of reading and writing, the tape drive takes out the cartridge attribute from the CM to enable optimal reading and writing.

The control unit 150 controls the entire tape drive 60. That is, the control unit 150 controls data writing onto the medium 40 and data reading from the medium 40, in accordance with a command received by the interface. Further, the control unit 150 controls the position determining unit 160 in accordance with a signal read from a servo track. Moreover, the control unit 150 controls a motion of the motor by means of the position determining unit 160 and the motor driver 170. Note that the motor driver 170 may be directly connected to the control unit 150.

The medium 40 in which a file to be updated is stored is loaded on the tape drive 60. The tape drive 60 reads out an index from the medium, and copies the index to a cache 80. The cache 80 is an external storage device such as a HDD, a flash storage (for example, a SSD), and a DRAM, and may be included in the tape drive 60. The cache may be a memory (DRAM) or the like in the tape drive. The LTFS copies the index stored in the IP of the medium to the cache at the same time as the medium is loaded on the tape drive. The LTFS can check whether to fragment the file by referring to the index copied in advance to the cache 80.

FIGS. 4A-4D illustrate contents of the index partition and the data partition of the medium in the LTFS format.

FIG. 4A illustrates metadata that is written onto the tape medium in response to (e.g., immediately after) its initialization in the LTFS format.

For example, immediately after the initialization of the tape medium in the LTFS format, information illustrated in FIG. 4A is written onto the tape medium.

A format identification data set (FID) is special data that is written onto the beginning of the tape medium when the tape drive initializes the tape medium, and includes information such as the number of partitions on the tape medium and the capacity of each partition.

VOL1 Label is also called ANSI Label, and is a general format label defined literally by ANSI.

LTFS Label is a label defined in the LTFS format, and is a label that holds information indicating a version of the LTFS format to which the format of the tape medium conforms. In this label, the size of a record to be written onto the medium is designated. The record size is also referred to as block size. Even in the case where the tail end of a file is less than the record size (for example, 512 KB), the record size is fixed.

File Mark (FM), which is generally used for a tape medium, is something like a bookmark, and is used to seek desired data.

Index#0 is an index written at the time of formatting. Because no file exists at this stage, Index#0 does not include information specific to a file, and is written to hold information such as a volume name of the tape medium.

FIG. 4B illustrates information that is written onto the tape medium in the case where a file is written after the initialization in the LTFS format.

If a file (File 1) is written after the initialization in the LTFS format, data written on the tape medium is changed to as illustrated in FIG. 4B. Portions surrounded by thick lines each correspond to added or updated data. Index#1 includes metadata (index) of File 1. The IP holds only the latest index, while the DP holds the index history. When to update the index depends on implementation of the file system. For example, the index is updated for each given time, or is updated only when the tape medium is taken out from the tape drive. In the case of further continuous use, only the latest index is always put in the IP, whereas a new file and a new index are appended in the DP without overwriting the existing indexes.

FIG. 4C illustrates information that is written onto the tape medium in the case where a file (File 2) is further written after the state of FIG. 4B.

If the next file (File 2) is added after the first file (File 1) is written onto the tape medium, File 2 is stored into the tape medium continuously with stored File 1. Index#2 includes metadata (index) of File 1 and File 2.

FIG. 4D illustrates metadata that is written onto the medium after File 1 is updated by adding character information (File 1-2) to the tail end of File 1 after the state of FIG. 4B.

Depending on applications, a document creation application (for example, a word processor) updates files written on a medium, and then records each file (File 1) in a fragmented (distributed) manner (File 1-1 and File 1-2). In the case of such file rewriting, an amount of decrease in free space of the tape medium at the time required to perform the update depends on the amount of updated information. That is, even if the file size is large, if the amount of update is small, the free space in the capacity of the medium hardly decreases, and hence there is not any disadvantage. However, seeking is necessary at the time of reading out the file, and hence it takes time to read out the file. The problem that the seeking takes time can be regarded as a problem particular to the LTFS, because the time required for the seeking is extraordinarily longer in the tape drive than in a hard disk. Embodiments of the present invention have an object to provide a method for improving the time required to read out a fragmented file.

FIG. 5 illustrates changed contents of position metadata (extent) included in the index file in the case where one file is partially rewritten.

The index stores position information (pointer) of a file in a form called an extent. An element of the extent includes: a number of a block (StartBlock) at the beginning of a portion (data portion) of the file; a start offset (ByteOffset) in the block of this number; a size (ByteCount) of the data; and a file position (FileOffset) of the data portion. User data is recorded in the medium in units of a record, that is, units of a size (for example, 512 KB) designated by the block size.

StartBlock indicates the order of blocks with a fixed size from the beginning of the tape medium. ByteOffset indicates an offset at which writing is started in a block of a particular number. ByteCount indicates the data size of the data portion designated by the extent. FileOffset indicates the file position of the data portion designated by the extent.

Each block includes a record or a file mark (FM: a separator of the record), and the size thereof is designated in LTFS Label. The user data is recorded in the medium in units of a record, that is, units of a size (for example, 512 KB) designated by the block size.

Figure 5A:
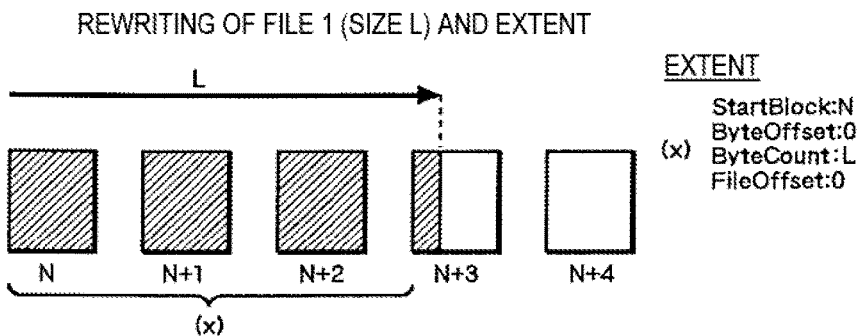
FIGS. 5A-5B illustrate changed contents of position metadata (extent) included in an index file in the case where one file is partially rewritten, in accordance with embodiments of the present invention.
Figure 5B:
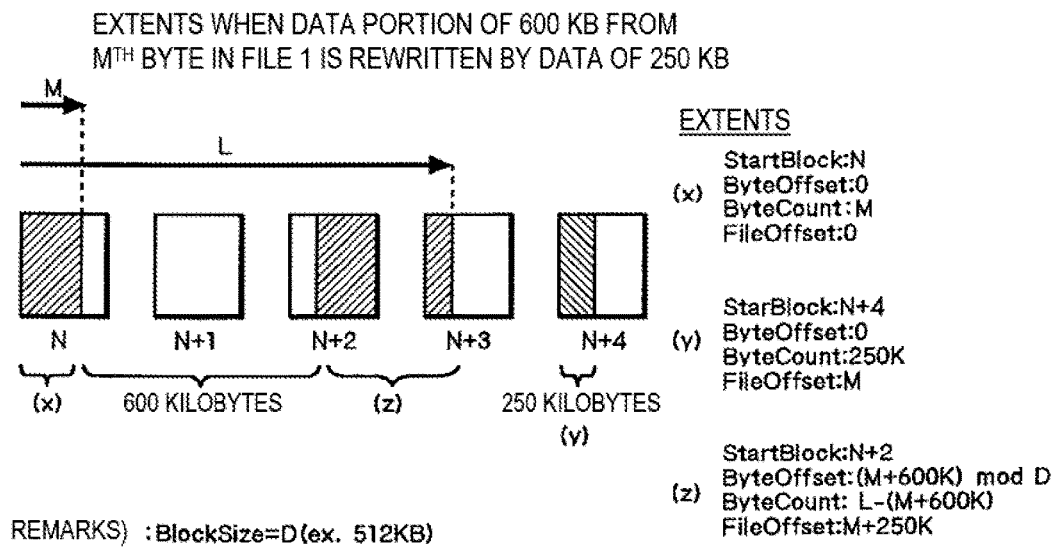

In a first case of FIG. 5A in which File 1 having a size of L is recorded in the medium, the index shows an extent (x). File 1 corresponds to shaded portions that are continuously written in units of a record in the longitudinal direction of the tape medium. In the extent, each record corresponds to a block. In a case depicted in FIG. 5B in which the data portion is rewritten, it is assumed that File 1 is written in FIG. 5A and a data portion of 600 KB from the $M^{th}$ byte in File 1 is then rewritten by a record of 250 KB. In this case, the index shows information about extents (x), (y), and (z). The extent (y) indicates the data (record) of 250 KB written by changing the data portion of 600 KB in File 1. This data is appended and written not as a continuous data portion but as a record of a subsequent block number (StartBlock: N+4).

The extent (y) appends and writes 250 KB from an offset ByteOffset=0 in StartBlock=N+4.

The extent (x) indicates data (record) up to ByteCount=M in StartBlock=N. The data of 600 KB from the offset M in the block N is changed.

The extent (z) indicates a data portion of ByteCount=L−(M+600) from ByteOffset=((M+600K) mod D) in StartBlock=N+2. D represents a block size (for example, 512 KB). ByteOffset is the remainder obtained by dividing M+600 KB by D, and gives an offset in the block number N+2.

The index of File 1 includes arrangement information indicating fragmentation (distribution) into the plurality of extents (x) to (y) to (z) as a result of the data portion rewriting. If File 1 is edited by the LTFS, the extents are distributed in such a manner, and sequential access to changed File 1 is not possible. Seeking of the extents (x) to (y) to (z) requires a tape rewinding operation, leading to a problem that read-out performance is deteriorated.

Detailed description is given of an embodiment in which data is read and written from the host application via the file system in the configuration (FIG. 1, FIG. 3) of the tape recording system. Embodiments of the present invention are implemented by software, for example, the cache manager.

In one embodiment, the cache manager prepares caches in the following manner at the first access to a tape. The first access may be an access request, for example a read access or a write access. The cache manager creates a read cache and a write cache for the tape. The cache manager reads out an index file of the tape, and creates a cache for storing the index file.

Figure 6:
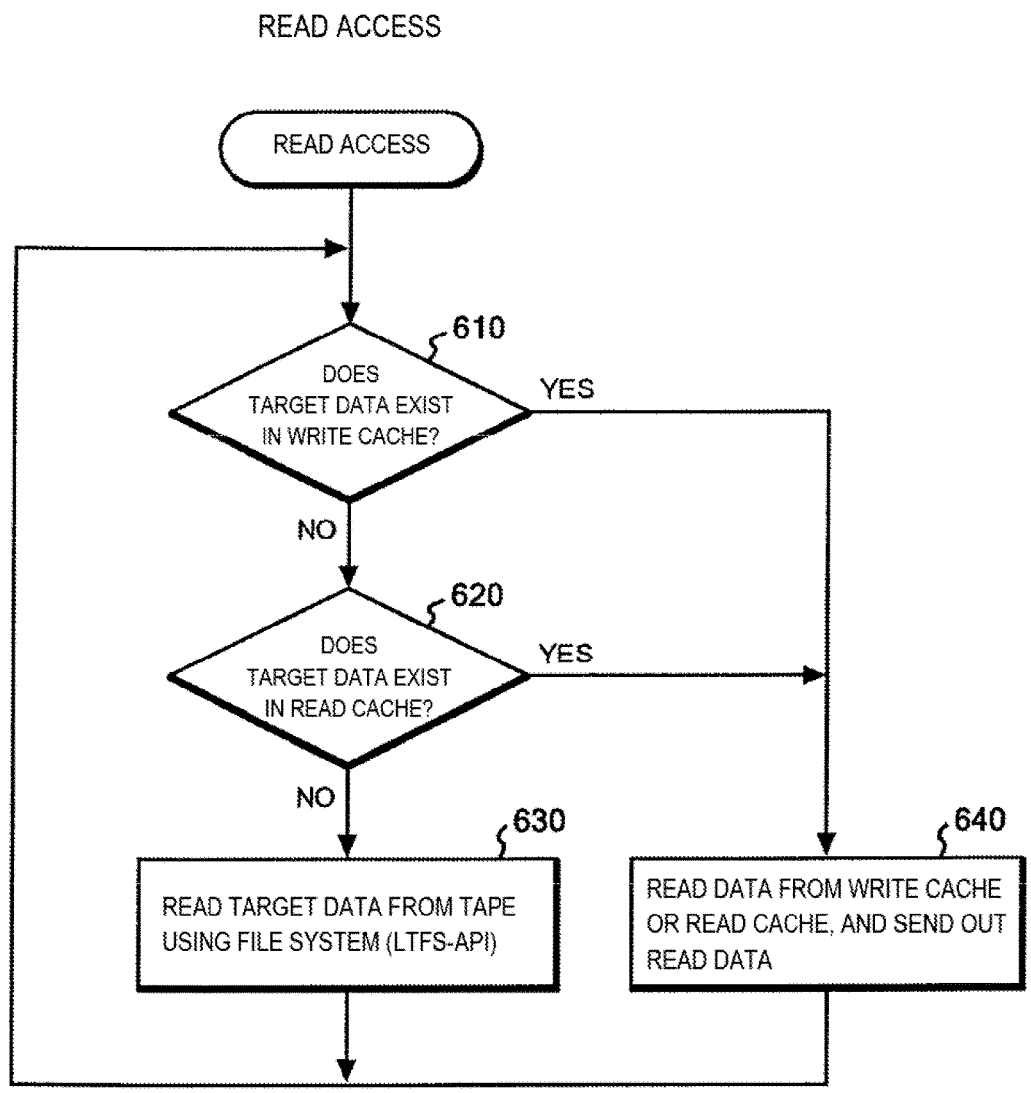
FIG. 6 shows a flow chart in the case of receiving read access, in accordance with embodiments of the present invention.

FIG. 6 shows a flow chart in the case of receiving read access.

At operation 610, the cache manager checks whether target data (e.g., the entirety or a part of a file) exists in the write cache. If the target data exists, the cache manager performs operation 640 without any further processing.

At operation 620, if the target data does not exist, the cache manager checks whether the target data exists in the read cache. If the target data exists, the cache manager performs operation 640 without any further processing.

At operation 630, if the target data does not exist, the cache manager reads the target data from the tape using the API provided by the LTFS.

At operation 640, the cache manager reads the target data from the write cache or the read cache, and sends out the target data to the host application.

In response to the read access, the cache manager that manages data transaction between each cache and the host or the tape apparatus repeats these operations.

Figure 7:
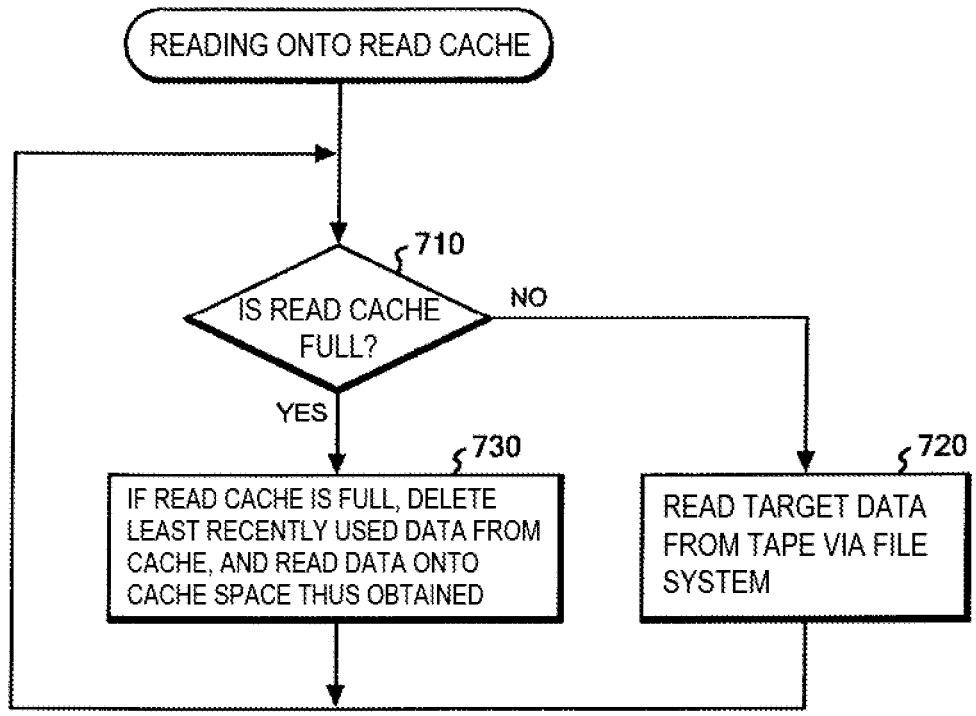
FIG. 7 shows a flow chart in the case of reading data onto a read cache, in accordance with embodiments of the present invention.

FIG. 7 shows a flow chart in the case of reading data onto the read cache.

At operation 710, the cache manager checks whether the read cache is full of data.

At operation 720, if the cache has an available space, the cache manager reads the target data from the tape via the file system (LTFS).

At operation 730, if the cache is full, the cache manager deletes least recently used (LRU) data from the cache, and reads the target data onto the space thus obtained.

The cache manager repeats the above-mentioned operations in response to the read access.

Figure 8:
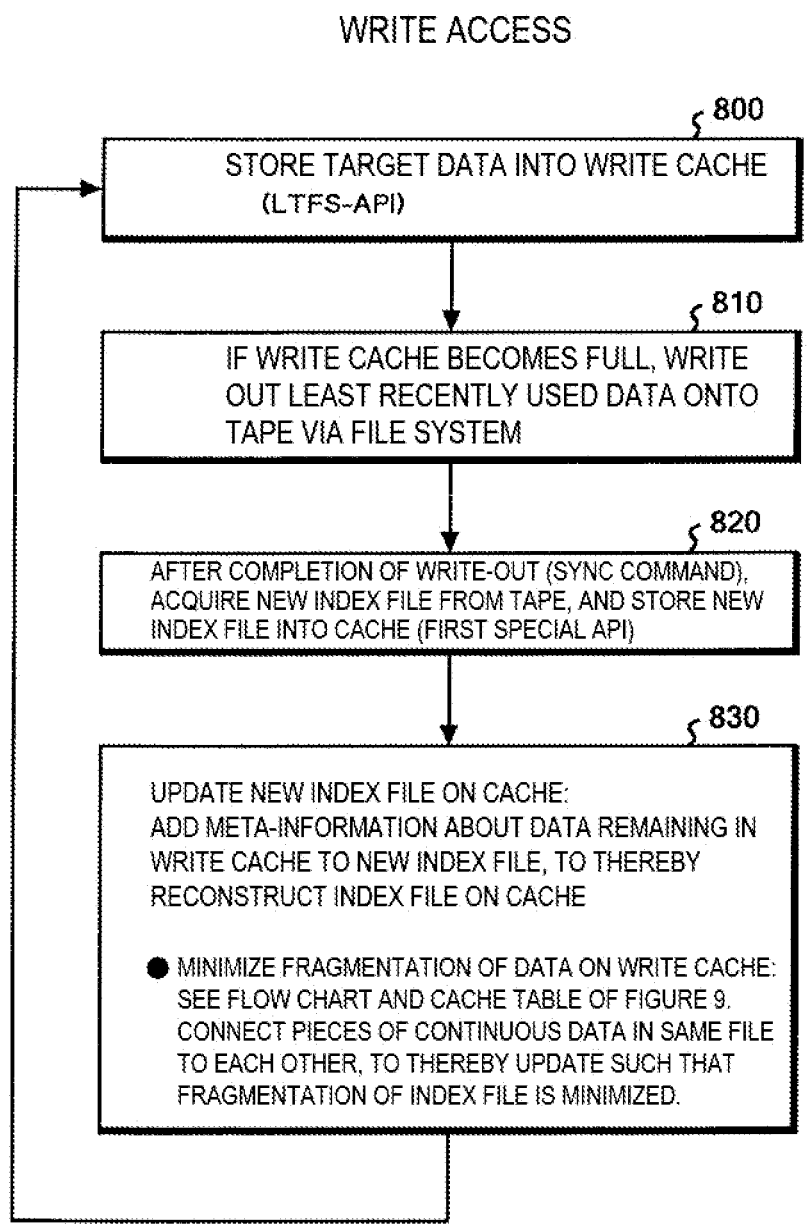
FIG. 8 shows a flow chart in the case of receiving write access, in accordance with embodiments of the present invention.

FIG. 8 shows a flow chart in the case of receiving write access.

Upon the reception of the write access from the application of the host, the cache manager performs the following operations.

At operation 800, the cache manager stores data of the write access via the LTFS-API, into the write cache.

At operation 810, if the write cache becomes full, the cache manager writes out least recently used (LRU) data onto the tape via the file system of the LTFS. After actual write access, the cache manager completely and reliably stores the data into the tape in response to a synchronization request (Sync command).

At operation 820, after completion of the write-out, the cache manager acquires a new index file from the tape, and stores the new index file into the index cache (first special API). In this operation, the index file on the tape is acquired again using the first special API, whereby a new index file is guaranteed to also be on the cache.

At operation 830, the cache manager writes information corresponding to data remaining in the cache to the new index file acquired from the tape to thereby update the index file to the latest one. In addition to the data that is written out onto the tape in operation 820, data to be cached out still remains in the tape. It is necessary to construct the latest index file in which such remaining data is reflected. Note that it is necessary to give consideration to minimize fragmentation of the index file of the data in the write cache at the time of reconstructing the index file. Although described below with reference to an update flow chart of FIG. 9, a technique adapted therefor includes connecting a plurality of pieces of continuous data included in the same file on the write cache, and writing the connected pieces of data onto the tape.

Figure 9A:
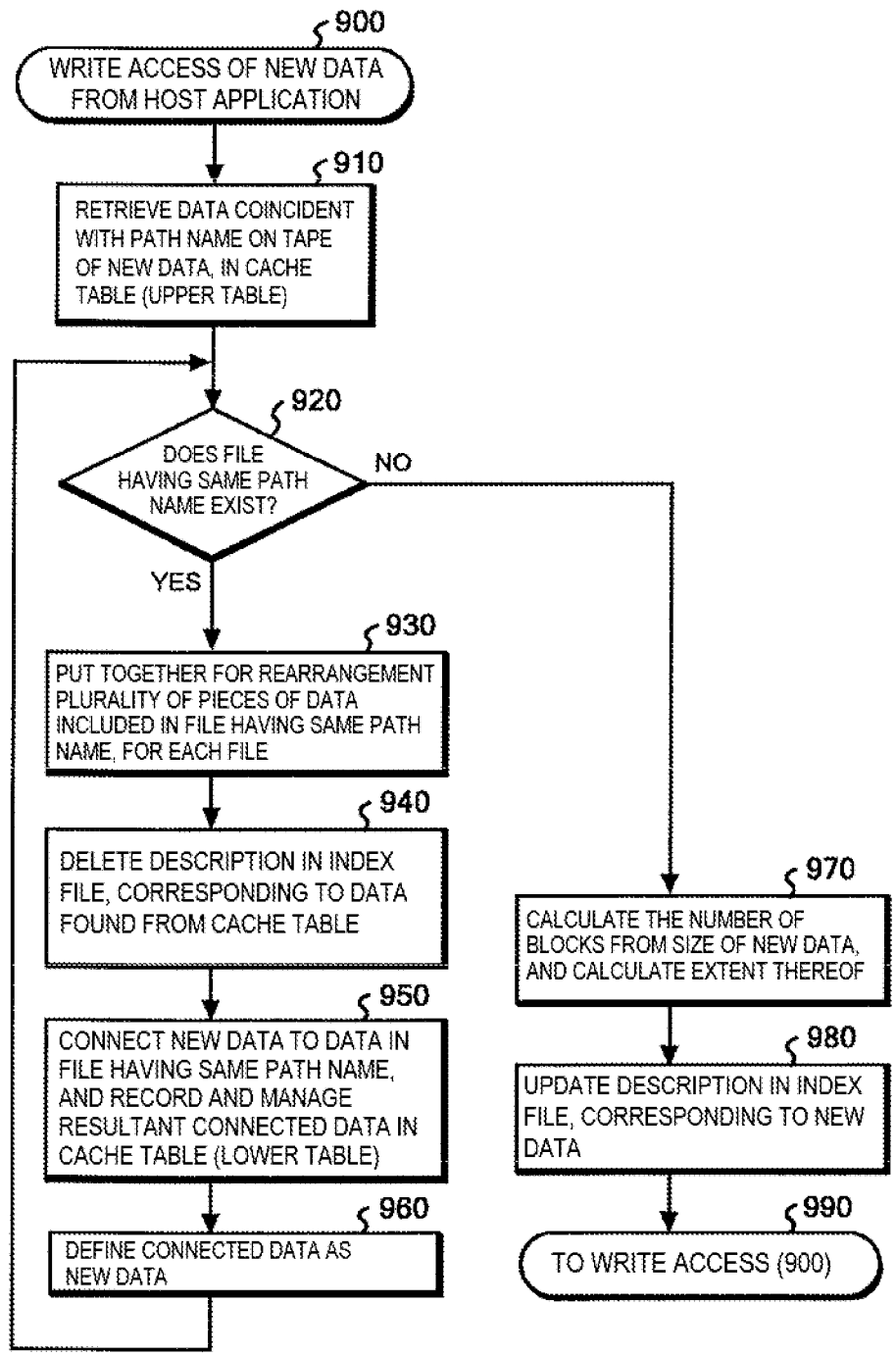
FIGS. 9A-9B show an index update flow chart and a cache table in the case of receiving the write access, in accordance with embodiments of the present invention.
Figure 9B:

FIGS. 9A-9B show an index update flow chart and a cache table in the case of receiving the write access. The cache manager performs a process of updating the latest index file in the cache by referring to the cache table for managing written data.

FIG. 9B shows the cache table to which the cache manager refers when the latest index file in which data is reflected is updated in the cache. The cache table represents metadata including a list of pieces of written data and the position and size of each piece of written data.

In order to record and retrieve data contents in the cache, the cache table provides: a write order data table (upper table) in which pieces of data are arranged in the order in which the pieces of data are written onto the write cache; and a connected data table (lower table) in which the pieces of data are rearranged such that pieces of continuous data included in the same file are connected to each other. The write order data table (upper table) is a temporary file in which the pieces of data are listed in chronological order of writing. This table shows, for each data, the offset and the size (length) in the file including the data. The connected data table is a temporary file in which pieces of continuous data included in the same file are connected to each other on the basis of the offsets and the sizes included in the write order data table.

FIG. 9A shows the flow chart showing an update of an index file in which target data in the cache that is not stored in the tape is reflected. The cache manager receives the write access, and performs the following operations.

At operation 900, the cache manager receives the write access of new data (target data) from the host application via the LTFS-API. The cache manager stores the new data, that is, the target data (the entirety or a part of the file) into the write cache.

At operation 910, the cache manager retrieves data coincident with a path name (file name) on the tape of the new data, in the cache table (upper table). The cache manager checks whether or not a file having the same file name as that of the file including the newly written data exists among files including pieces of data (for example, 001.dat, 002.dat, 003.dat) that are sequentially written from the host application via the LTFS-API. The application writes the target data while designating the path name, the offset, and the size using the LTFS-API of the file system. The cache manager can acquire each piece of data and metadata thereof from the LTFS-API, and can create the write order data table (upper table) as a temporary file.

At operation 920, the cache manager checks whether or not data included in the same file name as that of the new data exists in the cache table (upper table). If a file having the same file name as that of the new data does not exist in the cache table, the cache manager performs operation 970.

At operation 930, the cache manager puts together for rearrangement a plurality of pieces of data included in the same file name as that of the file of the new data, for each file. The cache manager puts together for rearrangement the plurality of pieces of data from the write order from the application into units of a file. The order of a plurality of pieces of data in one file is based on the offset in the file. Even in the case where data in the same file on the cache table is not continuous with the new data, it is intended that the pieces of data are put together for each file and are arranged on the tape. In particular, in the case where two pieces of data 001.dat and 003.dat included in the same file name, for example, fileA.txt are continuous with each other, the cache manager performs operation 950 for connection. The continuity of the new data in the same file can be determined by referring to the write order data table (upper table) and checking the offset and the size of each piece of data.

At operation 940, the cache manager deletes description (extent) in the index file, corresponding to the data in the same file found from the cache table. In the case where the data in the same file including the new data already exists in the cache table, description, that is, position metadata (extent) of the new data is not reflected in the latest index file registered in the index cache. It is necessary to delete the extent of the existing data in the same file from the latest index file (940), replace the deleted extent with the extent of connected data generated in operation 950 (970), and reconstruct the latest index file (980).

At operation 950, the cache manager connects the additional new data to the data in the same file found from the cache table, and records and manages the resultant connected data in the table. In operation 930, the plurality of pieces of data included in the same file have been put together and rearranged in the order of the offset in the file. In particular, in the case where two pieces of data are continuous with each other in consideration of the offset and the size, the two pieces of data are connected to each other into one piece of continuous data, and the cache table is rewritten with the offset and the size of the one piece of continuous data. For example, the connected data means 001.dat+003.dat included in the same path name fileA.txt on the lower table. Note that, even if two or more pieces of data included in the same file are not completely continuous with each other, the two or more pieces of data included in the same file are herein called "continuous data" for convenience sake. Specifically, with reference to the write order data table (upper table), the data 002.dat in a different file fileB.txt is interposed between the two pieces of data 001.dat and 003.dat included in the same file fileA.txt, and such tape arrangement influences read-out performance. Meanwhile, there is significance in that distribution (fragmentation) of a tape position can be reduced by such a process that the pieces of data are written as ones included in the same file irrespective of the order in which the pieces of data are written from the host application.

At operation 960, the cache manager defines the connected data as new data, and performs operation 920 to check whether or not third continuous data further exists under the same file name. In the cache table (lower table) of this example, no other data than the continuous data 001.dat and 003.dat exists, and hence the response in operation 920 is NO. In operations (970, 980), the cache manager performs a process of defining the connected data 001.dat+003.dat as new data and reflecting the new data in the index file.

At operation 970, the cache manager calculates the number of blocks from the size of the new data, and calculates the extent thereof.

At operation 980, the cache manager updates description, that is, position metadata (extent) in the index file, corresponding to the new data. The extent calculated in operation 970 gives the description, that is, the position metadata in the index file, corresponding to the new data. In order to secure the latest index file in which the new data is defined as one piece of data in a particular file, the cache manager adds the description (extent) of the new data to the latest index file.

At operation 990, the cache manager receives the write access of new data from the host application, and repeats operations 910 to 980.

The generation of the connected data is described in detail. The connected data is recorded as one piece of continuous data included in the particular file fileA.txt, and can avoid file fragmentation at the time of writing out onto the tape by the third special API. The write order data table (upper table) shows that the data 002.dat in the different file name fileB.txt is written from the application between the two pieces of data 001.dat and 003.dat in the same file name fileA.txt, on the write cache. The cache manager can retrieve the two pieces of data included in the same file name fileA.txt. Further, the cache manager can determine that the positions of the two pieces of data are continuous with each other on the basis of metadata (the offset, the size). The cache manager connects the two pieces of data 001.dat (the offset=0, the size=1024000) and 003.dat (the offset=1024000, the size=512000) included in the same file name (dirA/fileA.txt), gives one piece of position metadata (the offset=0, the size=1536000), rearranges the three pieces of data, and generates the connected data table (lower table). The cache manager can generate the extent (see FIG. 5) of the two connected pieces of data 001.dat and 003.dat included in the file name fileA.txt from the position metadata (the offset=0, the size=1536000), by referring to the connected data table.

Figure 10:
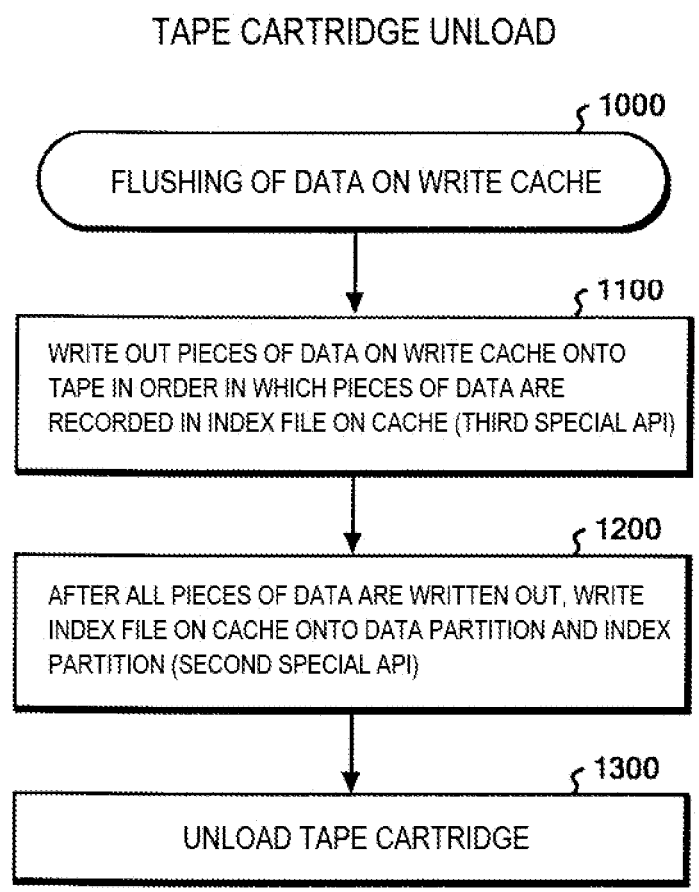
FIG. 10 shows a flow chart in the case of unloading a tape cartridge, in accordance with embodiments of the present invention.

FIG. 10 shows a flow chart in the case of unloading a tape cartridge.

At operation 1000, along with the unload of the medium, a process of flushing all pieces of data on the write cache into the tape is performed.

At operation 1100, the pieces of data on the write cache are written out onto the tape in the order in which the pieces of data are recorded in the index file on the cache. In this operation, the third special API is used, and the file system, for example, the LTFS-API is not used. Because write performance specific to the tape drive is exerted, the data can be saved to the LTFS tape at high speed.

At operation 1200, after all the pieces of data are written out, the latest index file on the index file cache is written onto the data partition and the index partition using the second special API. Because write performance specific to the tape drive is exerted, the index file can be saved to the LTFS tape at high speed.

At operation 1300, after the flushing of the data written on the cache and the latest index file into the LTFS tape in the above-mentioned operations is completed, the LTFS tape is unloaded from the tape drive.

At the time of unloading the medium, the cache manager writes the latest index file in which the latest written data is reflected, onto the LTFS tape using the second special API and the third special API, and thus guarantees the LTFS format.

As has been described above, according to the method of the present embodiment, data on every cache can be written out at high speed at the time of unloading a tape cartridge, and hence speeding-up of the cartridge unload can be achieved. Further, according to embodiments of the present invention, in the case of performing such an operation of repetitively modifying a file on the cache, index fragmentation or minimization, that is, data distribution can be suppressed. Note that the present invention is described by way of the embodiments mode (embodiments), but the scope of the present invention is not limited to the abovementioned embodiments. It is obvious for those skilled in the art that various changes and alternative modes can be adopted without departing from the spirit and scope of the present invention.

REFERENCE SIGNS LIST

40 . . . tape cartridge (medium, tape)
60 . . . tape drive (tape recording drive)
80 . . . external storage device (for example, HDD), cache
110 . . . communication interface (I/F)
120 . . . buffer (drive buffer)
130 . . . recording channel
140 . . . reading and writing head
150 . . . control unit (including controller and read and write controller)
160 . . . position determining unit
170 . . . motor driver
180 . . . motor
300 . . . host (server)

What is claimed is:

1. A method for communicating data with a medium loaded on a tape apparatus via a file system in a tape recording system connected to a host, the tape recording system including the tape apparatus, the method comprising:
    providing a cache for storing target data of a file, the file being identified by an access request received from an application of the host, the cache being divided into: a read cache for storing target data from the medium in response to a read access; a write cache for storing target data from the application in response to a write access; and an index cache for storing an index file acquired from an index partition of the medium, the index file including metadata about a plurality of files;
    in response to receiving the access request:
        loading the medium onto a drive using a file system;
        storing target data to the write cache and to the read cache;
        updating the index file stored in the index cache to reflect position metadata about the target data stored in the write cache;
        rearranging the target data and an order of a plurality of pieces of data based on an offset in the index file and a size of each of the plurality of pieces of data, wherein rearranging includes identifying where two pieces of data are continuous with each other in consideration of the offset and the size, connecting the two pieces of data to each other into one piece of continuous data, and rewriting the write cache with the offset and the size of the one piece of continuous data;
        updating the index file on the index cache such that metadata about the target data and the plurality of pieces of data reflects the rearrangement by connecting the target data and the pieces of continuous data to avoid fragmentation;
        writing the plurality of pieces of data stored in the write cache to the medium in an order in which each piece of data is recorded in the index file on the index cache based on the offset in the index file and a size of each of the plurality of pieces of data;
        writing, after the plurality of pieces of data are written to the medium, the index file of the index cache to the data partition and the index partition;
    in response to initiating unloading of the medium from the drive:
        writing the updated index file stored in the index cache to the index partition of the medium; and
        writing the target data stored in the write cache onto a data partition of the medium without using the file system.

2. The method according to claim 1, further comprising:
    determining that the access request is a read access;
    determining whether the target data exists in at least one of the write cache and the read cache; and
    sending the target data to the application.

3. The method of claim 2, wherein determining whether the target data exists in at least one of the write cache and the read cache further comprises:
    determining that the target data does not exist in the write cache and, in response, determining whether the target data exists in the read cache.

4. The method of claim 2, wherein determining whether the target data exists in at least one of the write cache and the read cache further comprises:
    determining that the target data does not exist in either of the write cache or the read cache and, in response, sending the target data to the application from the medium using the file system.

5. The method according to claim 1, further comprising:
    determining that the access request is a read access and, in response, determining whether the read cache is full;
    determining that the read cache is full and, in response, discarding least recently used data from the cache to create a free space in the cache; and
    reading the target data from the medium to the free space.

6. The method according to claim 1, wherein
    determining that the access request is a write access;
    determining that the target data of the write access is included in a first file of the plurality of files, wherein the first file includes a plurality of pieces of data previously stored in the write cache.

7. The method according to claim 6, wherein updating the index file on the index cache further comprises:
    determining that the target data is continuous with at least one piece of data previously stored in the write cache.

8. The method according to claim 7, wherein updating the index file on the index cache further comprises:
    creating, as a temporary file, a write order data table reflecting an order in which the plurality of pieces of data were written to the write cache based, at least in part, on offsets and sizes of each of the plurality of pieces of data;
    creating, as a temporary file, a connected data table in which pieces of continuous data included in the same file are connected to each other by way of the offsets and the sizes from the write order data table;

calculating an extent of the plurality of pieces of data remaining in the write cache, based, at least in part, on the offsets and the sizes included in the connected data table;

adding the extent to a latest index file acquired from the medium; and updating the index file on the index cache.

9. The method according to claim 1, wherein
the cache is provided to a storage device of the host.

10. A program product for communicating data with a medium loaded on a tape apparatus via a file system in a tape recording system connected to a host, the tape recording system including the tape apparatus, the program product causing the tape recording system to:

provide a cache for storing target data of a file, the file being identified by an access request received from an application of the host, the cache being divided into: a read cache for storing target data from the medium in response to a read access; a write cache for storing target data from the application in response to a write access; and an index cache for storing an index file acquired from an index partition of the medium, the index file including metadata about a plurality of files;

in response to receiving the access request:
  load the medium onto a drive using a file system;
  store target data to the write cache and to the read cache;
  update the index file stored in the index cache to reflect position metadata about the target data stored in the write cache;
  rearrange the target data and an order of a plurality of pieces of data based on an offset in the index file and a size of each of the plurality of pieces of data, wherein rearranging includes identifying where two pieces of data are continuous with each other in consideration of the offset and the size, connecting the two pieces of data to each other into one piece of continuous data, and rewriting the write cache with the offset and the size of the one piece of continuous data;
  update the index file on the index cache such that metadata about the target data and the plurality of pieces of data reflects the rearrangement by connecting the target data and the pieces of continuous data to avoid fragmentation;
  write the plurality of pieces of data stored in the write cache to the medium in an order in which each piece of data is recorded in the index file on the index cache based on the offset in the index file and a size of each of the plurality of pieces of data;
  write, after the plurality of pieces of data are written to the medium, the index file of the index cache to the data partition and the index partition;

in response to initiating unloading of the medium from the drive:
  write the updated index file stored in the index cache to the index partition of the medium; and
  write the target data stored in the write cache onto a data partition of the medium without using the file system.

11. The program product of claim 10, wherein the program product further causes the tape recording system to:
  determine that the access request is a read access;
  determine whether the target data exists in at least one of the write cache and read cache; and
  send the target data to the application.

12. The program product of claim 11, wherein causing the tape recording system to determine whether the target data exists in at least one of the write cache and the read cache further causes the tape recording system to:
  determine that the target data does not exist in the write cache and, in response, determine whether the target data exists in the read cache.

13. The program product of claim 11, wherein causing the tape recording system to determine whether the target data exists in at least one of the write cache and the read cache further comprise causing the tape recording system to:
  determine that the target data does not exist in either of the write cache or the read cache and, in response, send the target data to the application from the medium using the file system.

14. The program product of claim 10, wherein the program product further causes the tape recording system to:
  determine that the access request is a read access and, in response, determine whether the read cache is full;
  determine that the read cache is full and, in response, discard least recently used data from the cache to create a free space in the cache; and
  read the target data from the medium to the free space.

15. A tape recording system for communicating data with a medium loaded on a tape apparatus via a file system, the tape recording system comprising the tape apparatus, the tape recording system being connected to a host and being configured to:

provide a cache for storing target data of a file, the file being identified by an access request received from an application of the host, the cache being divided into: a read cache for storing target data from the medium in response to a read access; a write cache for storing target data from the application in response to a write access; and an index cache for storing an index file acquired from an index partition of the medium, the index file including metadata about a plurality of files;

in response to receiving the access request:
  load the medium onto a drive using a file system;
  store target data to the write cache and to the read cache;
  update the index file stored in the index cache to reflect position metadata about the target data stored in the write cache;
  rearrange the target data and an order of a plurality of pieces of data based on an offset in the index file and a size of each of the plurality of pieces of data, wherein rearranging includes identifying where two pieces of data are continuous with each other in consideration of the offset and the size, connecting the two pieces of data to each other into one piece of continuous data, and rewriting the write cache with the offset and the size of the one piece of continuous data;
  update the index file on the index cache such that metadata about the target data and the plurality of pieces of data reflects the rearrangement by connecting the target data and the pieces of continuous data to avoid fragmentation;
  write the plurality of pieces of data stored in the write cache to the medium in an order in which each piece of data is recorded in the index file on the index cache based on the offset in the index file and a size of each of the plurality of pieces of data;
  write, after the plurality of pieces of data are written to the medium, the index file of the index cache to the data partition and the index partition;

in response to initiating unloading of the medium from the drive:
  write the updated index file stored in the index cache to the index partition of the medium; and
  write the target data stored in the write cache onto a data partition of the medium without using the file system.

16. The tape recording system of claim 15, wherein the tape recording system is further configured to:
  determine that the access request is a read access;
  determine whether the target data exists in at least one of the write cache and the read cache; and
  send the target data to the application.

17. The tape recording system of claim 16, wherein the tape recording system being configured to determine whether the target data exists in at least one of the write cache and the read cache further comprises the tape recording system being configured to:
  determine that the target data does not exist in the write cache and, in response, determine whether the target data exists in the read cache.

18. The tape recording system of claim 16, wherein the tape recording system being configured to determine whether the target data exists in at least one of the write cache and the read cache further comprises the tape recording system being configured to:
  determine that the target data does not exist in either of the write cache or the read cache and, in response, send the target data to the application from the medium using the file system.

19. The tape recording system of claim 15, wherein the tape recording system is further configured to:
  determine that the access request is a read access and, in response, determine whether the read cache is full;
  determine that the read cache is full and, in response, discard least recently used data from the cache to create a free space in the cache; and
  read the target data from the medium to the free space.

* * * * *